Nov. 24, 1970     T. R. GILL     3,542,517

CORROSION TESTING APPARATUS

Filed Feb. 12, 1968     4 Sheets-Sheet 1

INVENTOR.
THOMAS R. GILL
BY
Watts, Hoffmann, Fisher & Heinke
ATTORNEYS.

Nov. 24, 1970 T. R. GILL 3,542,517
CORROSION TESTING APPARATUS
Filed Feb. 12, 1968 4 Sheets-Sheet 2
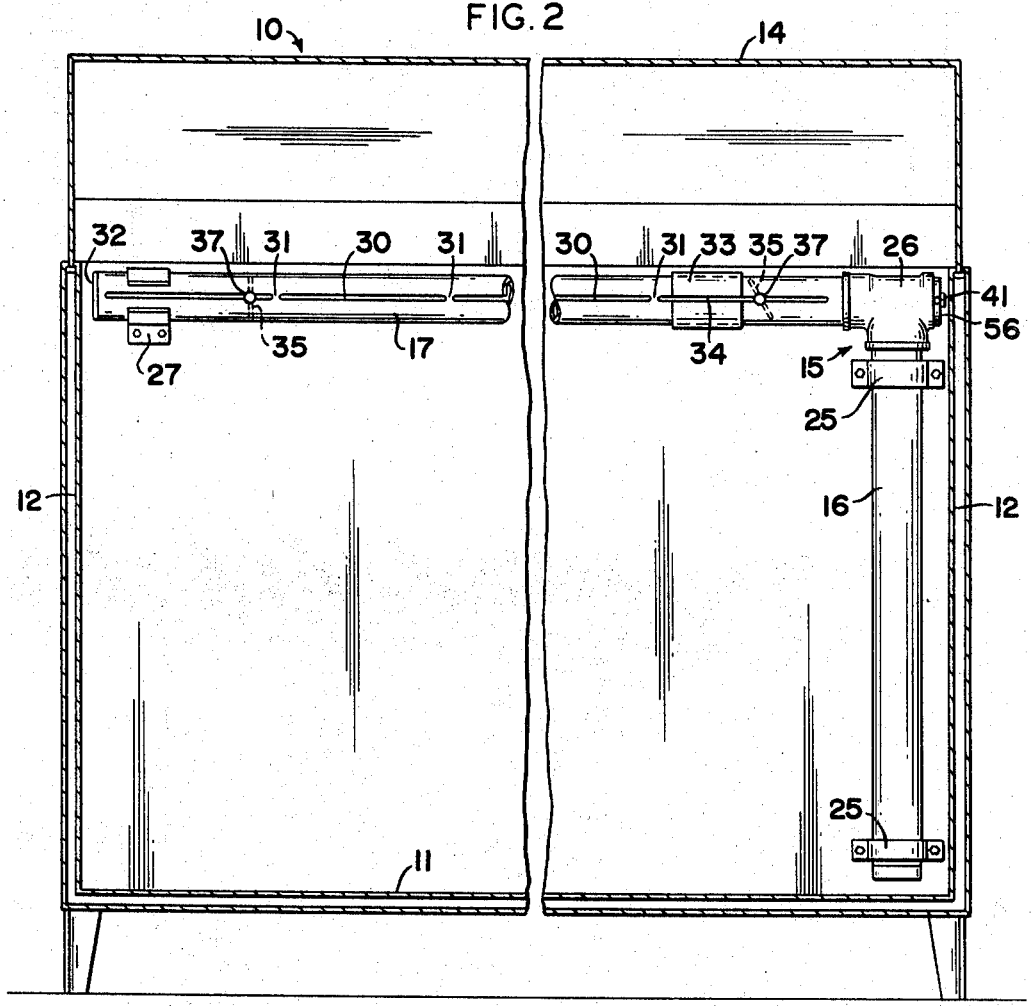
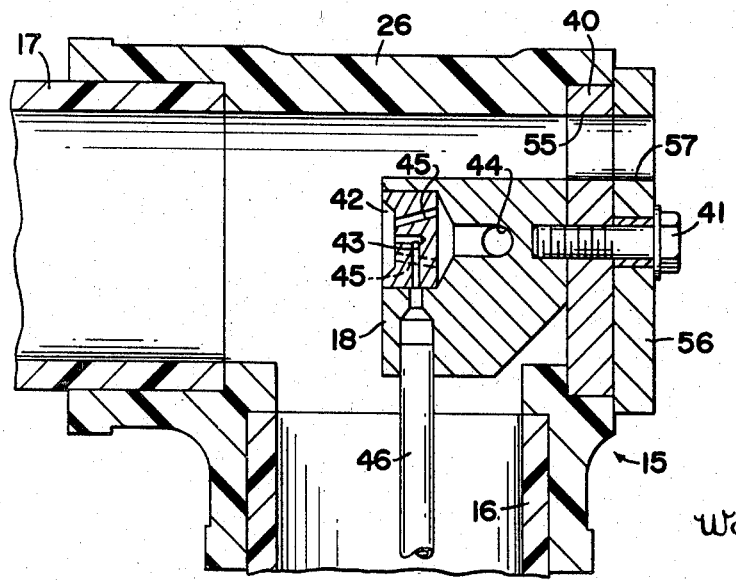
INVENTOR.
THOMAS R. GILL
BY
Watts, Hoffmann, Fisher & Heinke
ATTORNEYS.

Nov. 24, 1970 — T. R. GILL — 3,542,517
CORROSION TESTING APPARATUS
Filed Feb. 12, 1968 — 4 Sheets-Sheet 3
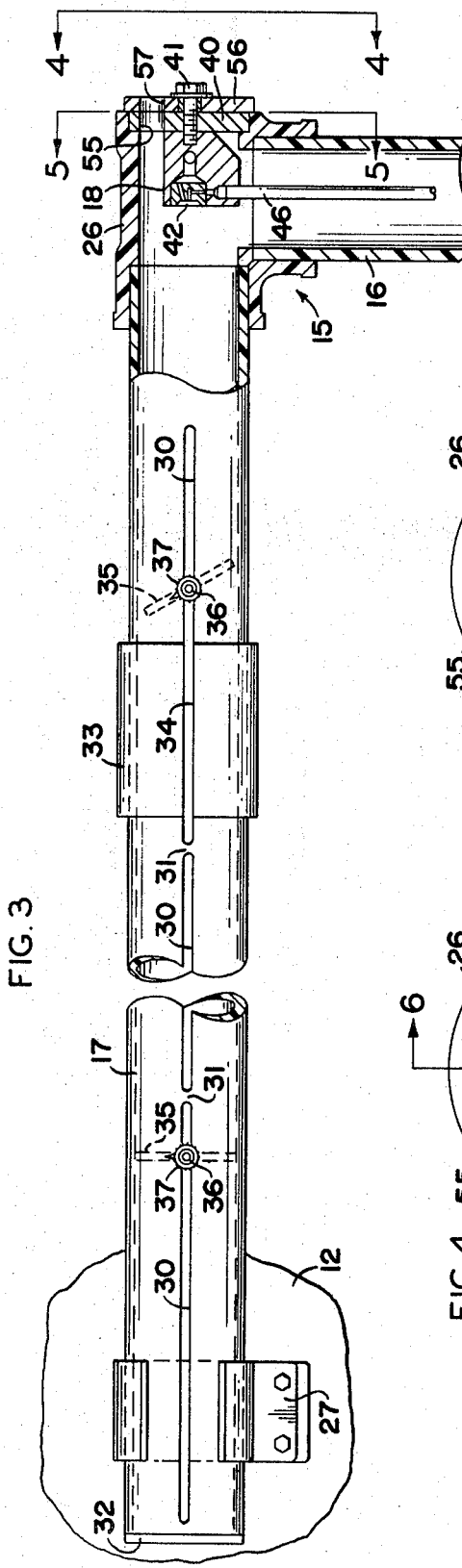
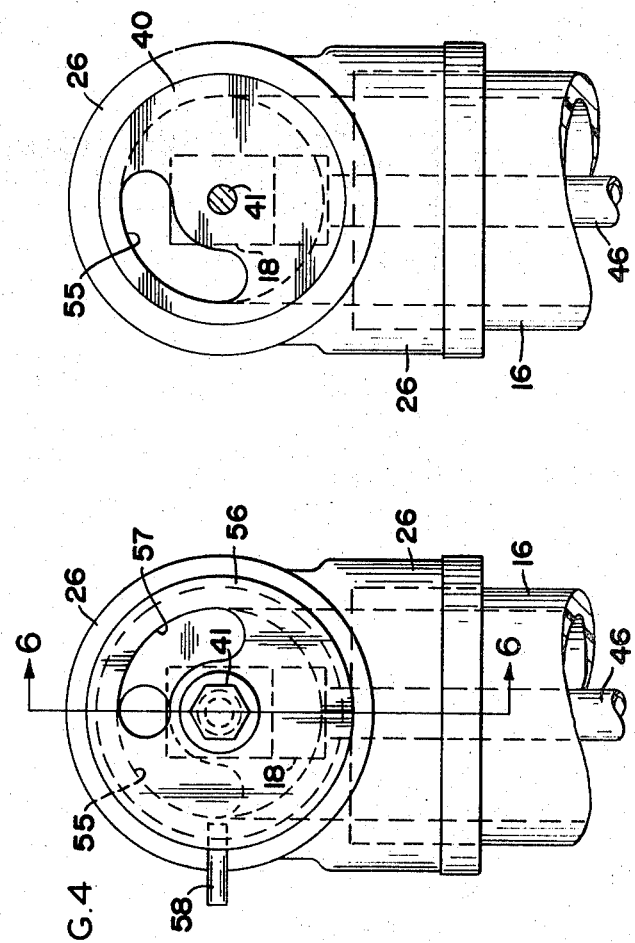
INVENTOR.
THOMAS R. GILL
BY
Watts, Hoffmann, Fisher & Heinke
ATTORNEYS.

United States Patent Office 3,542,517
Patented Nov. 24, 1970

3,542,517
CORROSION TESTING APPARATUS
Thomas R. Gill, Pompano Beach, Fla., assignor to
G S Equipment Company
Filed Feb. 12, 1968, Ser. No. 704,903
Int. Cl. B01f 3/04; B05b 7/02; F24h 3/14
U.S. Cl. 23—253                                27 Claims

ABSTRACT OF THE DISCLOSURE

Apparatus especially constructed for corrosion testing including a precipitation flow tube adapted to extend crosswise at a test enclosure above its floor, a solution reservoir, and an aspirator nozzle arranged to siphon a test solution from the reservoir and to emit an atomized fluid spray into the flow tube, the flow tube having outlet means formed along its length from which a fog mist is emitted into the enclosure.

BACKGROUND OF THE INVENTION

The present invention relates generally to the art of accelerated corrosion testing, and more particularly to accelerated corrosion testing apparatus.

The standard and accepted method of accelerated corrosion testing is known as "salt spray testing." According to this method, a fog-like dispersion of salt and/or other corrosion-inducing material is produced in a test cabinet and is allowed to settle over the test specimens positioned within the cabinet. The usual test equipment includes an atomizing spray nozzle which aspirates a salt solution from a suitably located reservoir. The spray nozzle is supplied with warm, moisture-laden air, as from a humidifying tower wherein heated air is bubbled through a water bath to obtain the desired humidification.

The control of salt spray testing is essentially empirical and it is therefore necessary to eliminate significant variables in order to obtain dependable and reproducible results. For example, in conducting comparison tests to determine which of a plurality of test specimens offers the maximum corrosion resistance, it is necessary to provide standardized conditions. Effective quality control programs also require standardized testing techniques capable of producing accurate and consistent test data in order that the quality of manufactured parts can be controlled. In practice, these uniform testing conditions must be reproducible in test after test conducted in the same cabinet as well as in different cabinets and in different geographic locations.

U.S. Pat. Re. 25,932 discloses apparatus which for the first time made it possible to obtain the standardized conditions and reproducible results required for successful accelerated corrosion techniques, and this apparatus has been approved for use by the American Society for Testing and Materials. As disclosed in the patent, the apparatus is comprised of an upwardly extending precipitation tube adapted to be positioned on the floor of a test cabinet, and a suitable nozzle positioned to emit an atomized corrosive fluid mist into the tube, preferably near its lower end. The tube forms a flow passage for the mist which is emitted from an outlet in the tube near the top of the cabinet.

The foregoing apparatus is constructed and designed so that large liquid drops are removed from the fluid mist before being emitted into the cabinet. As the mist produced by the nozzle rises through the tube, the large liquid drops are precipitated from the mist so as to produce within the cabinet a finely divided and controlled fog which is purged of drops of test liquid. The finely divided mist can be distributed uniformly throughout the cabinet so that it is possible to obtain accurate and reproducible test results.

While the apparatus disclosed in the above-identified patent has proved successful in producing a uniform fog mist of the desired characteristics and thereby making it possible to conduct accurate and dependable corrosion tests, the general arrangement of the apparatus within the test cabinet has been inconvenient in certain instances. The location of the precipitation tube on the floor of the cabinet and the extension of the tube to a location near the top of the cabinet obstructed the usable test area. As a result, it could be difficult properly to position large parts for corrosion tests. Another consideration is that large cabinets, for example walk-in chambers, may require several of the conventional fog towers in order to fill the test space, and this requirement adds to the cost of the installation.

SUMMARY OF THE INVENTION

The present invention overcomes the previously discussed problems encountered with the prior art, and provides new apparatus for producing a corrosive fog mist in an improved manner.

The invention is based on the discovery that it is possible to generate a fog mist of uniform droplet size without passing the mist through an upstanding precipitation tube. According to the preferred construction, the new apparatus is comprised of a vertical reservoir tube, a flow tube extending crosswise of the test cabinet above its floor, and an aspirator nozzle positioned to aspirate a liquid from the reservoir tube and to emit an atomized fluid spray into the lateral flow tube. The flow tube is slotted or otherwise apertured along its length to provide an outlet from which the fog mist is emitted into the cabinet. Adjustable air entrainment apertures are preferably provided near the nozzle in order to control the amount of air entrained in the fog mist which is emitted from the nozzle. In addition the flow tube may be provided with structure for adjusting the size of the slotted outlet and/or for controlling the emission of the mist from selected portions of the outlet along the length of the tube.

The flow tube may extend either partially or completely across the cabinet from one wall to another. The nozzle can be located near one end of a single tube or a plurality of nozzles can be positioned to emit atomized fluid sprays into the tubes extending in opposite directions. With all of these arrangements, the flow tube or tubes can be located near a side or sides of the cabinet in order to provide an unobstructed test area wherein the parts to be corrosion tested can be conveniently positioned. Another advantage is that the aspirating apparatus can be connected to the cabinet by the manufacturer, thus making the apparatus convenient to ship and to assemble for use.

In large cabinets the new aspirating apparatus can be conveniently located to fill the test area with the fog mist. A plurality of nozzles positioned at several locations in the chambers, as has been necessary with the prior art devices, are not required.

An object of the invention is to provide new apparatus especially adapted for use in corrosion testing characterized by a flow tube or tubes extending crosswise of the test cabinet above its floor.

Another object of the invention is to provide new apparatus especially adapted for corrosion testing characterized by a vertical reservoir tube, a laterally extending flow tube, and an aspirating nozzle positioned to emit an atomized fluid spray into the flow tube.

A further object of the invention is to provide new apparatus especially adapted for use in corrosion testing including a vertical reservoir tube, a laterally extending flow tube having an outlet or outlets along its length, an aspirator nozzle positioned to emit an atomized fluid spray into the flow tube, and means for controlling the amount of air entrained in the spray.

Another object of the invention is to provide apparatus especially adapted for corrosion testing including a test cabinet, structure forming a tubular flow path secured to a side of the cabinet and extending crosswise of the cabinet above its floor, a vertical reservoir tube connected to the cabinet, a nozzle positioned to emit an atomized fluid spray into the flow path, and means 'for controlling the amount of fog mist emitted from the flow path in selected areas along its length.

Other objects and advantages of the invention will be apparent from the following detailed description and the accompanying drawings.

DESCRIPTION OF THE DRAWINGS

FIG. 2 is a cross-sectional view taken on the line 2—2 of FIG. 1;

FIG. 3 is an enlarged fragmentary view taken substantially on line 3—3 of FIG. 1;

FIG. 4 is an enlarged fragmentary view taken on the line 4—4 of FIG. 3;

FIG. 5 is an enlarged, fragmentary view taken substantially on the line 5—5 of FIG. 3;

FIG. 6 is an enlarged, fragmentary view of a portion of the apparatus;

DESCRIPTION OF THE PREFERRED EMBODIMENTS

Figure 1:
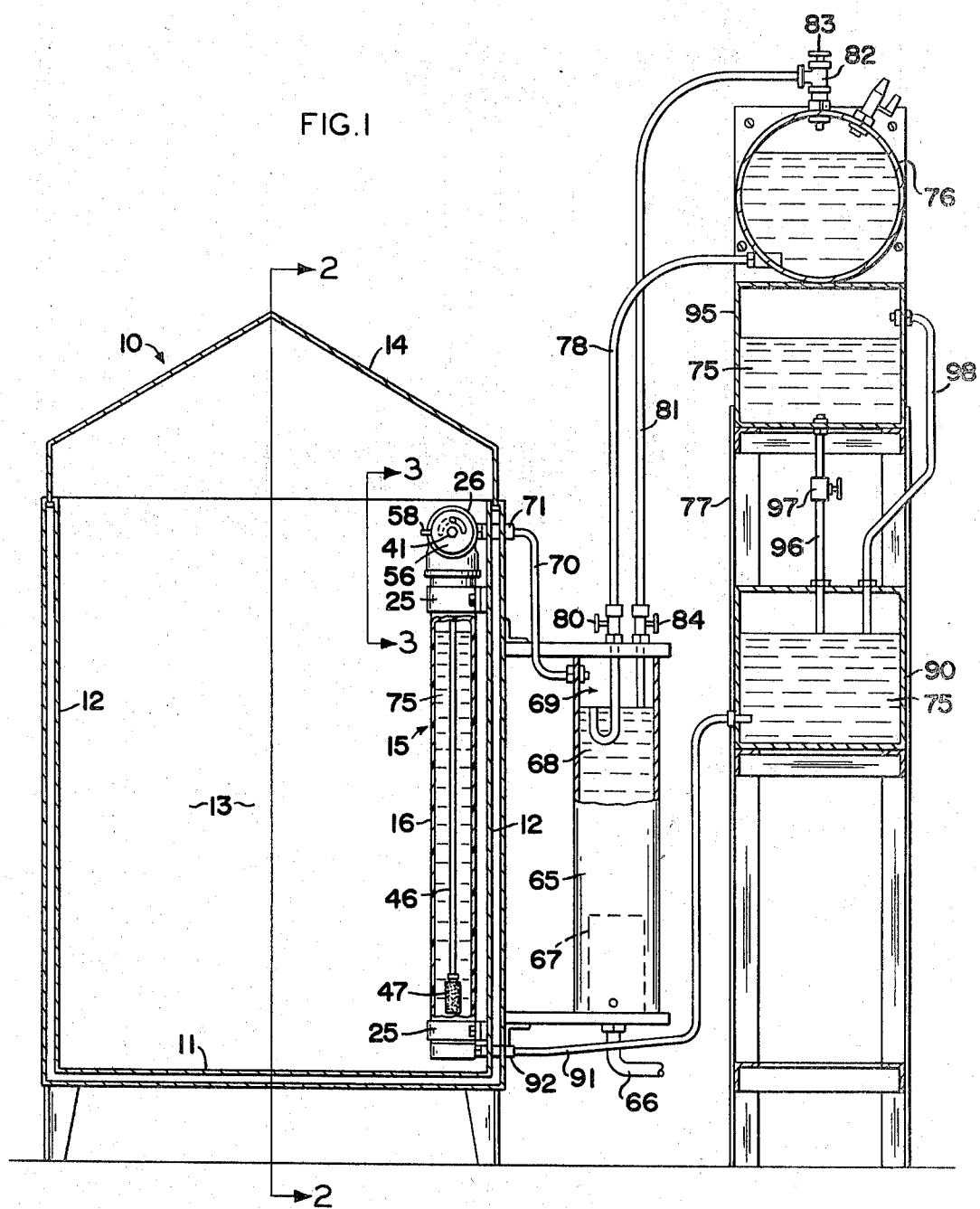
FIG. 1 is a schematic, side elevational view, partially in cross-section, illustrating a salt spray test apparatus embodying the present invention.

Referring now to the drawings, and to FIGS. 1 and 2 in particular, a test cabinet is shown generally at 10. The cabinet 10 is of conventional construction and includes a corrosion resistant floor or base 11 and corrosion resistant walls 12 which define the test area 13. A movable cover 14, which also is resistant to corrosion, is supported by the walls 12 to provide access to the normally closed space 13. When the apparatus is in operation, test specimens may be supported on racks (not shown) which are normally positioned on brackets (also not shown) connected to the walls 12 within the test space area 13 of the cabinet 10.

An aspirator assembly 15 is provided for producing a fog-like dispersion of salt and/or other corrosion inducing material in the test space 13 of the cabinet 10. The aspirator assembly 15 is constructed of plastic to provide maximum corrosion resistance, and in accordance with the present invention is comprised of an upstanding tube 16 and a laterally extending tube 17. The tube 16 serves as a reservoir from which a corrosion producing liquid, such as a salt solution, is supplied to an atomizing nozzle 18 (FIGS. 3 and 6). The nozzle 18 is positioned to emit an atomized salt spray mist into the tube 17 which defines a precipitation flow path for the mist within the cabinet 10.

The reservoir tube 16 may be disposed either externally or internally of the cabinet 10. In the illustrated and preferred arrangement, the tube 16 is disposed within the cabinet 10 adjacent one corner thereof and is connected to a wall 12 by brackets 25. Referring particularly to FIGS. 2, 3 and 6, it will be seen that the flow tube 17 communicates with and is connected to the upper end of the reservoir tube 16 by a fitting 26 in the form of an elbow. The tube 17 extends crosswise of the cabinet 10 above its floor 11 along the upper edge of one of the walls 12 adjacent the cover 14. The tube 17 may be positioned at an angle to the horizontal such that the liquid drops which are precipitated in the tube can flow back into the reservoir tube 16. A suitable bracket 27 is provided for connecting the tube 17 to the adjacent cabinet wall 12.

As shown most clearly in FIG. 3, the tube 17 is slotted along its length, as designated by reference numeral 30, to provide an outlet for the fog mist. The slotted outlet opening 30 may be interrupted at longitudinally spaced intervals 31 for the purpose of maintaining the structural rigidity of the tube. In use the tube 17 is oriented so that the slotted outlet 30 is directed away from the adjacent cabinet wall 12 to emit the fog mist into the central portion of the cabinet 10. The end 32 of the tube 17 which is remote from the fitting 26 may be open, but is preferably closed so that all of the fog mist produced by the nozzle 18 is exhausted through the slotted opening 30.

Depending upon such factors as the size of the cabinet 10, the location of the specimens to be tested, the length of the tube 17, and the flow rate of the fog mist within the tube, it may be desirable to control the amount of the fog mist which is emitted from the slotted outlet 30 in selected areas alnog the length of the tube 17. To this end one or more rotatably adjustable sleeves 33 may be mounted on the tube 17 at any desired axial location. As shown most clearly in FIG. 3, the sleeve 33 is split to provide a longitudinal slot 34 which has a width at least equal to the width of the tube slot 30. When the sleeve 33 is in the illustrated position, the slot 34 is aligned with the tube slot 30 to permit unobstructed flow of fog mist from the tube slot. It will be apparent that the sleeve 33 can be infinitely adjusted between the fully open position of the slotted opening 30 and a fully closed position in which the slot 34 is angularly spaced from the slot 30. The flow of the fog mist from the slotted opening 30 can be further controlled in selected areas along the length of the tube 17 by one or more baffles 35 rotatably mounted within the tube. Each of the baffles 35 preferably conforms to the internal shape of the tube 17 and has a threaded stem 36 projecting from the slotted opening 30. A nut 37 on the stem 36 can be tightened to secure the baffle in a selectively adjusted position. When a selected baffle 35 is perpendicular to the axis of the tube 17, the baffle will block flow of the fog mist downstream from the baffle and the entire volume of the mist generated by the nozzle 18 will be exhausted through the upstream portions of the slotted opening 30. Conversely, when a selected baffle 35 is positioned parallel to the axis of the tube 17, the baffle will have no effect on the flow of the fog mist. The baffles can be selectively adjusted between the two extreme positions in order to variably control the volume of the mist emitted from the upstream and downstream portions of the slotted opening 30.

In the preferred construction of the aspirator assembly 15, the nozzle 18 is mounted within the fitting 26 and is connected to its rear wall 40 by a bolt 41. The nozzle 18 is of a conventional type including an outlet orifice 42 positioned to emit an atomized fluid spray along the axis of the tube 17, a liquid passage 43 communicating with the orifice, an air inlet passage 44, and metering passages 45 which communicate the air inlet passage with the outlet orifice. A solution pick-up tube 46 is connected to the nozzle 18 in communication with the liquid passage 43 and extends downwardly into the reservoir tube 16. As shown in FIG. 1, a conventional filter or strainer 47 is connected to the lower inlet end of the pick-up tube 46.

The amount of the fluid spray emitted from the nozzle 18 into the tube 17 can be regulated by selective adjustment of the size of an air entrainment opening which is provided in the rear wall 40 of the fitting 26. As shown in FIGS. 3–6, the wall 40 has an elongated, arcuate or curved opening 55 adjacent to the base of the nozzle 18. A disc 56 having a similarly shaped opening 57 is rotatably journalled on the bolt 41 adjacent the external surface of the wall 40. The disc 56 can be infinitely adjusted by a handle 58 between a fully open position wherein the openings 55, 57 are in registry and a fully closed position wherein the openings are completely out of registry. In the fully open position, air will flow into the fitting 26 through the aligned openings 55, 57 and will be entrained in the fluid spray. This prevents a vacuum from forming in the tube 17 and substantially eliminates resistance to the emission of the fluid spray from the nozzle. As will be apparent from FIG. 4, rotation of the disc 56 toward the fully closed position progressively decreases the size of the aperture formed by the openings 55, 57 and thereby reduces the amount of air which is entrained in the fluid spray. As a result, a vacuum is created in the tube 17 which inhibits the emission of the spray.

Humidified air is supplied to the nozzle 18 from a conventional air saturator or humidifying tower 65 which is shown connected to the cabinet 10. An air supply line 66 is connected to the bottom end of the tower 65 for supplying air from a suitable source (not shown) such as an air compressor or the like. A suitable immersion heater 67 is disposed within the bottom end of the tower 65 for heating the water to a desired temperature. In use, the air bubbles upwardly through a column of heated water 68 which is maintained in the tower into an air space 69 at the top of the tower. The heated and humidified air is conducted from the air space 69 in the tower to the aspirator nozzle 18 through a saturated air line 70 which communicates with the air inlet passage 44 of the nozzle. A suitable fluid tight seal 71 is provided around the air line 70 in the side wall of the cabinet through which the air line extends.

In accordance with the invention disclosed in U.S. Pat. No. 3,163,497, issued Dec. 29, 1964 to Thomas R. Gill, suitable controls are provided for automatically maintaining a constant height of the water column 68 in the humidifying tower 65 and thereby assuring complete saturation of the air supplied to the nozzle 18 during the conduction of corrosion tests. Controls are also provided for automatically maintaining a constant level of salt solution 75 in the reservoir tube 16 and thereby maintaining a constant siphon pick-up height for the nozzle 18.

In order to maintain the column of water 68 at a constant height in the tower 65, a water supply reservoir tank 76 is supported above the tower on a suitable stand 77. A water supply line 78 is connected to the bottom of the tank or reservoir 76 and extends down into the top of the tower 65. As shown, the water supply line 78 has a U-shaped end portion within the tower 65 which prevents the air bubbling upwardly in the tower from entering the supply line. Alternately, the supply line 78 can be straight and a suitable baffle or air control pipe arrangement provided to prevent the entrance of air into its lower end. A valve 80 also is shown as being provided in the line 78 near the top of the tower 65 in order that the supply of water from the reservoir 76 can be shut off when desired.

An air line conduit 81 is connected to the top portion of the reservoir 76 by a fitting 82. The reservoir 76 can be refilled when desired by adding water through an opening in the fitting 82 which is normally closed by a threaded plug 83. The lower end of the air control line 81 extends down into the top of the tower 65 and terminates at or above the horizontal plane in which the outlet end of the liquid supply line 78 is located. A shut-off valve 84 is shown in the line 81 adjacent the top of the tower 65.

When the column of water 68 in the humidifying tower 65 falls below the end of the control line 81, air will enter the control line and pass into the top of the reservoir 76. This air breaks the vacuum in the reservoir 76 and induces a flow of water from the reservoir through the supply line 78 to replenish the water in the humidifying tower. The flow of water continues until the water in the humidifying tower has again reached the desired height, as determined by the position of the lower end of the air control line 81. When the water reaches the lower end of the control line 81, air will be prevented from further entering the reservoir and the flow of water to the tower will be automatically shut off.

A salt solution or other test liquid is supplied to the reservoir tube 16 from an external reservoir 90 which is also mounted on the stand 77. The reservoir tube 16 and the external reservoir 90 are connected by a solution line 91 which extends through one of the walls 12 of the cabinet 10. A suitable fluid-tight seal 92 is provided between the solution line 91 and the wall of the cabinet through which the solution line extends. The external reservoir 90 is supported on the stand 77 so that the bottom of the reservoir is level with the bottom of the reservoir tube. Because of this arrangement, the test solution 75 will seek the same level in the reservoir 90 and the tube 16.

The level of the solution 75 within the reservoir 90 and the tube 16 is automatically controlled by an arrangement including a solution level control reservoir 95 which is mounted on the stand 77 above the reservoir 90. The control reservoir 95 is provided with a normally sealed opening (not shown) so that fresh test solution 75 can be added to the reservoir when desired.

A liquid supply line 96 is connected to the bottom of the control reservoir 95 and extends down into the top of the reservoir 90. A suitable valve 97 may be provided in the conduit 96 in order that the supply of solution from the control reservoir can be shut off manually, as when refilling the reservoir. A liquid feed control line 98 is connected to the top portion of the reservoir 95 above the level of solution therein. The opposite end of the control line 98 projects downwardly into the lower reservoir 90. The lower end of the control line 98 within the reservoir 90 may terminate at or above the horizontal plane of the outlet end of the liquid supply line 96.

When the level of the solution 75 within the lower reservoir 90 falls below the end of the control line 98, air will enter the line 98 and pass into the top portion of the level control reservoir 95. This passage of air through the control line 98 breaks the vacuum in the control reservoir 95 and induces a flow of solution through the conduit 96 into the lower reservoir 90 to raise the level of the solution 75. When the level of the solution 75 again reaches the lower end of the line 98, the solution will prevent air from entering the control line and thereby prevents further flow of test solution from the control reservoir 95.

The operation of the aspirator assembly 15 during the conduction of a salt spray corrosion test will be apparent from the foregoing description. In summary heated and humidified air is supplied to the nozzle 18 which siphons the salt solution from the reservoir tube 16 to produce an atomized fluid spray. The fluid spray is directed into the flow tube 17 which extends along the upper edge of a cabinet wall 12. As the spray passes through the flow tube, liquid drops are precipitated in the tube and flow back into the reservoir tube 16 to result in the formation of a finely divided fog mist which is emitted from the slotted opening 30 into the test space 13. The amount of the spray in the tube 17 can be controlled by adjustment of the control disc 56. It is also possible to control the amount of the fog mist which is emitted from various portions of the slotted opening 30 by adjustement of the sleeves 33 and/or the baffles 35.

While the nozzle 18 has been shown positioned near one end of a flow tube 17 which extends nearly the entire length of the cabinet 10 along one side, it will be understood that the tube 17 can be of a shorter length depending upon the positioning of the test specimens. In other arrangements, flow tubes can be mounted to extend along a plurality of the cabinet walls, as well as in other locations in the cabinet above its floor.

Figure 7:
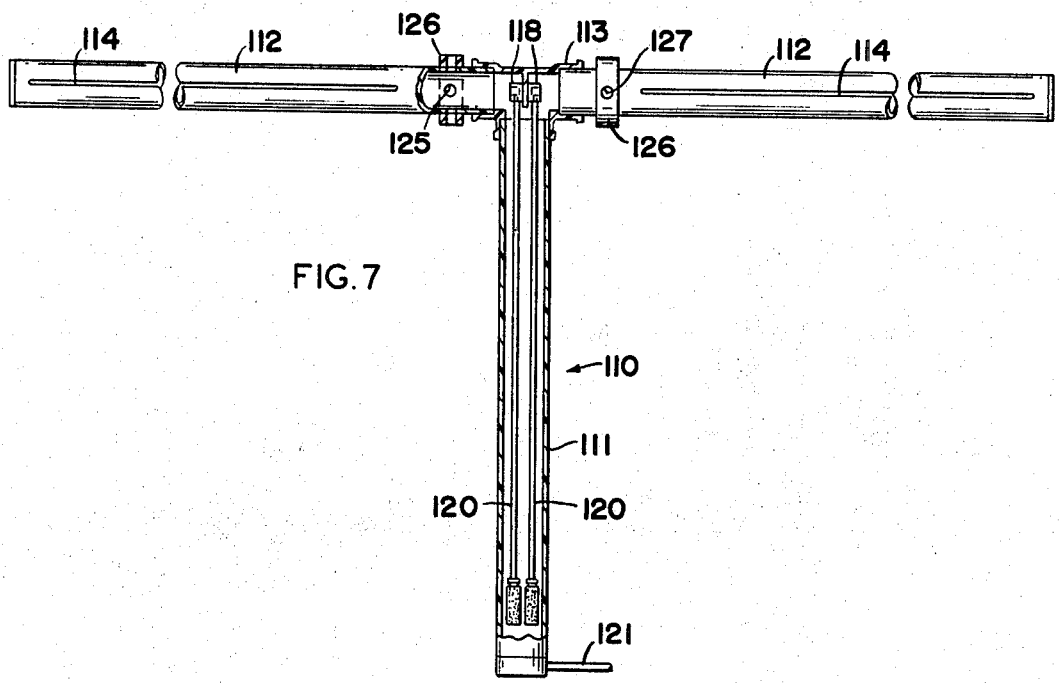
FIG. 7 is a side elevational view, partially in cross-section, of another preferred embodiment of the present invention.

Referring now to FIG. 7, there is shown a modified aspirator assembly 110 constructed in accordance with the present invention. The aspirator assembly 110 is comprised of an upstanding reservoir tube 111 and two flow tubes 112 which extend laterally in opposite directions from the upper end of the tube 111 and are connected thereto by a fitting 113. Each of the tubes 112 is similar to the flow tube 77 of the previously described embodiment of the invention, and is slotted along its length, as designated by reference numeral 114, to provide an outlet for the fog mist generated therein. Rotatably adjustable sleeves and/or baffles such as shown in FIG. 3 may be provided in association with the tubes 112, if desired.

A pair of nozzles 118 are located within the fitting 113 and are pointed in opposite directions to emit fluid sprays into the oppositely extending, lateral flow tubes 112. As shown, a solution pick-up tube 120 is connected to each nozzle and extends downwardly into the reservoir tube 111. A saturated air line (not shown) is provided for each nozzle 118 for connecting it to a humidifying tower. Solution is supplied to the reservoir tube 111 through a conduit 121 that is adapted to be connected to a supply reservoir in the same manner described above in conjunction with FIG. 1.

In the embodiment of FIG. 7, each of the tubes 112 is provided with a plurality of air induction apertures 125 adjacent the associated nozzle 118 for controlling the amount of fog produced by the nozzle. The apertures 125 are circumferentially spaced and are located with their axes lying in a common plane transverse to the tube axis. An adjustable ring 126 having correspondingly spaced apertures 127 is rotatably mounted on each of the tubes 112 to overlie the tube apertures 125. Each of the rings 126 is rotatable between a fully open position in which the apertures 125, 127 are aligned, thereby permitting air to be entrained within the spray and preventing a vacuum from being formed in the associated flow tube, and a fully closed position in which the apertures 125 and 127 are out of alignment to prevent air from being entrained in the spray.

In use the aspirator assembly 110 may be positioned within a test cabinet so that the reservoir tube 111 and the nozzles 118 are located adjacent to and centrally of a cabinet wall and so that the flow tubes 112 extend crosswise of the cabinet above its floor toward opposite ends thereof. This arrangement is particularly suited for large cabinets, and is adapted to uniformly produce and distribute a fog mist therein without obstructing the test space.

Figure 8:
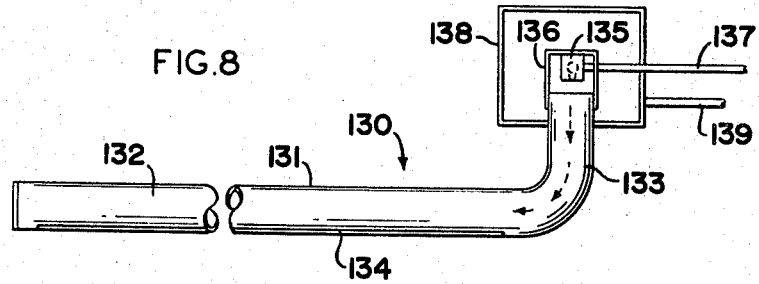
FIG. 8 is a top plan view of still another preferred embodiment of the present invention.

FIG. 8 illustrates another embodiment 130 of the present invention which is adapted to be mounted and arranged in a test cabinet in a manner similar to the embodiments of FIGS. 1–7. The aspirator assembly 130 is comprised of a generally horizontal tube 131 having an elongated flow portion 132 and a transverse arm 133 at one end thereof. The tube flow portion 132 is slotted along its length, as designated by reference numeral 134, to provide a fog mist outlet. A fog mist producing aspirator nozzle 135 similar to the nozzle 18 shown in FIG. 6 is mounted adjacent the open end of the arm 133 by a bracket 136 and is positioned to emit a spray mist into the arm 133. A saturated air line 137 communicates with the nozzle 135 and is adapted to be connected to a humidifying tower. While the nozzle 135 has been shown as being located outside of the tube arm 133, it will be understood that the nozzle can be located within the arm and that suitable air entrainment controls, such as described above in conjunction with either FIGS. 6 or 7, can be provided.

As shown in FIG. 8, a solution reservoir 138 is positioned below the nozzle 135 and is adapted to be supplied with solution through a feed line 139. A solution pick-up tube (not shown) is connected to the nozzle 135 and extends down into the reservoir 138. If desired, a solution reservoir tube, such as shown in the embodiments of FIGS. 1–7, may be employed in place of the illustrated reservoir 138. When in use the aspirator assembly 130 is adapted to be positioned within a test cabinet so that the flow tube portion 132 extends crosswise of the cabinet above its floor and preferably along one wall thereof.

It will be apparent from the foregoing that in each of the described embodiments the arrangement of the aspirator assembly and particularly the location of the flow tube which extends crosswise of the cabinet above the floor, does not obstruct the test area or interfere with the location of the test specimens therein. At the same time, the aspirator assembly is constructed and arranged to obtain a uniform distribution of the mist within the test space so that all of the specimens will be subjected to the same corrosive test conditions.

Many modifications and variations of the invention will become apparent in view of the foregoing detailed disclosure. Therefore, it is to be understood that, within the scope of the appended claims, the invention can be practiced otherwise than as specifically shown and described.

What is claimed is:

1. Test apparatus comprising a reservoir tube, a laterally extending flow tube connected to said reservoir tube, said flow tube having an apertured side wall to provide outlet means extending along the length of said flow tube, an aspirator nozzle positioned to emit an atomized fluid spray into said flow tube, and a solution pick-up tube connected to said nozzle and extending into said reservoir tube.

2. Test apparatus as claimed in claim 1 wherein said flow tube is formed with a plurality of openings which define said outlet means.

3. Test apparatus as claimed in claim 1 including a second apertured flow tube extending from an end of said first-mentioned flow tube, and a second nozzle positioned to emit a fluid spray into said second flow tube.

4. Test apparatus as claimed in claim 1 including means forming an air inlet opening of variable size communicating with said flow tube adjacent said nozzle.

5. Test apparatus as claimed in claim 1 including means for controlling the size of said outlet means at a selected location along the length of said flow tube.

6. Test apparatus as claimed in claim 1 including fog mist control means positioned along the length of said flow tube, said control means being adjustable to regulate the amount of fog mist emitted from said outlet means upstream and downstream from said control means.

7. Test apparatus comprising an enclosure for retaining an atmosphere of corrosion testing mist therein, said enclosure having sides, a top and a bottom, a solution reservoir, an aspirator nozzle, a solution pick-up tube connected to said nozzle and extending down into said reservoir, means connected to said nozzle for supplying an atomizing gas thereto, a laterally extending flow tube located above the floor of said enclosure, said flow tube extending crosswise of said enclosure and having a side wall formed with outlet means along the length of said tube, said aspirator nozzle being in a position to emit a fluid spray into said flow tube to produce a fog mist that is exhausted through said outlet means into said enclosure.

8. Test apparatus as claimed in claim 7 wherein said reservoir is defined by a tube, and wherein said reservoir tube is connected to said laterally extending flow tube.

9. Test apparatus as claimed in claim 7 wherein said nozzle is located at the juncture of said tubes, and including means for controllably introducing air into said flow tube, said air being entrained in the spray produced by said nozzle.

10. Test apparatus as claimed in claim 7 wherein said flow tube is slotted along its length to form said outlet means.

11. Test apparatus as claimed in claim 7 including means for controlling the amount of fog mist emitted from said outlet means at a selected location along the length of said flow tube.

12. Test apparatus comprising an enclosure for retaining an atmosphere of corrosion testing mist therein, said enclosure having sides, a top and a bottom, solution reservoir means, tube means defining a flow path within said enclosure, said tube means being axially oriented in a laterally extending direction above the bottom of said enclosure, said tube means having outlet means along the length of said tube means, nozzle means positioned to emit a fluid spray into said flow path to produce a fog mist that is exhausted from said outlet means into said enclosure, and means communicating with said nozzle means for supplying solution from said reservoir means.

13. Test apparatus as claimed in claim 12 wherein said nozzle means is located near one end of said flow path.

14. Test apparatus as claimed in claim 12 wherein said tube means comprises a pair of tubes extending in opposite directions to define said flow path, and wherein said nozzle means comprises a pair of nozzles each located near an end of a tube.

15. Test apparatus as claimed in claim 12 wherein said tube means comprises an elongated portion and an arm at one end of said elongated portion.

16. Test apparatus as claimed in claim 12 wherein said nozzle means comprises a plurality of nozzles positioned to emit fluid spray in opposite directions.

17. Test apparatus as claimed in claim 16 wherein said nozzles are located between the ends of said flow path.

18. Test apparatus comprising an enclosure for retaining an atmosphere of corrosion testing mist therein, said enclosure having sides, a top and bottom, means defining a tubular flow path within said encolsure, said tubular flow path being axially orientated in a laterally extending direction above the bottom of said enclosure, mist-producing aspirator nozzle means positioned to emit an atomized fluid spray into said flow path, said means defining said flow path including outlet means from which mist can be emitted from said flow path into said enclosure, solution reservoir means, means forming a liquid connection between said nozzle means and said reservoir means, and means for supplying a gas under pressure to said nozzle means.

19. Test apparatus as claimed in claim 18 wherein the portion of said means defining said flow path is slotted along its length to form said outlet means.

20. Test apparatus as claimed in claim 18 wherein said flow path is disposed adjacent to and extends along a side of said enclosure.

21. Test apparatus as claimed in claim 18 wherein said means defining said flow path comprises a tube having an arm at one end, and wherein said nozzle means is positioned to emit a spray into said arm.

22. Test apparatus as claimed in claim 18 wherein said reservoir means comprises an upstanding reservoir tube extending below said nozzle means.

23. Test apparatus as claimed in claim 22 wherein said reservoir tube is located within said enclosure.

24. Test apparatus as claimed in claim 18 wherein said outlet means is formed along the length of said flow path.

25. Test apparatus as claimed in claim 24 including means for controlling the amount of mist emitted from said outlet means at a selected location along the length of said flow path.

26. Test apparatus as claimed in claim 25 wherein said control means comprises structure for controlling the size of said outlet means.

27. Test apparatus as claimed in claim 25 wherein said control means comprises a baffle adjustably positioned within said flow path for regulating the flow of mist therethrough, said baffle being positionable to variably regulate the amount of mist emitted from upstream and downstream portions of said outlet means.

References Cited

UNITED STATES PATENTS

| Re. 25,932 | 12/1965 | Neffenger. | |
|---|---|---|---|
| 1,491,443 | 4/1924 | Toombs | 261—116 |
| 2,889,003 | 6/1959 | Koch | 261—116 XR |

MORRIS O. WOLK, Primary Examiner

R. M. REESE, Assistant Examiner

U.S. Cl. X.R.

23—230; 261—65, 74, 76, 116